UNITED STATES PATENT OFFICE.

PHILIPP OTT, OF ELBERFELD, GERMANY, ASSIGNOR TO THE FARBENFABRIKEN, VORMALS FR. BAYER & CO., OF SAME PLACE.

DISAZO DYE.

SPECIFICATION forming part of Letters Patent No. 498,405, dated May 30, 1893.

Application filed January 26, 1893. Serial No. 459,911. (Specimens.) Patented in France April 28, 1892, No. 221,233, and in Italy June 24, 1892, XXVI, No. 32,191.

*To all whom it may concern:*

Be it known that I, PHILIPP OTT, doctor of philosophy, chemist, (assignor to FARBENFABRIKEN, VORMALS FR. BAYER & CO., of Elberfeld, Germany,) a subject of the Emperor of Germany, residing at Elberfeld, Germany, have invented a new and useful Improvement in the Manufacture of Dye-Stuffs, (for which the aforesaid FARBENFABRIKEN has already obtained Letters Patent in the following countries: France, No. 221,233, dated April 28, 1892, and Italy, Vol. XXVI, No. 32,191, dated June 24, 1892,) of which the following is a specification.

My invention relates to the production of a new disazo coloring-matter by combining one molecular proportion of diazo benzene chloride or another diazo benzene salt, with one molecular proportion of the so called Clève's alphanaphthylamine betamonosulpho acid beta or delta or a soluble salt thereof (described in the *Bulletin de la Société Chimique*, Vol. 26, page 447, and *Berichte der Deutschen Chemischen Gesellschaft*, Vol. 21, page 3264,) by rediazotizing the so formed amidoazo compound and coupling the resulting diazo derivative with one molecular proportion of phenylnapthylamine sulpho acid derived from alphanapthylamine alpha monosulpho acid (1:8).

The phenylnaphthylamine monosulpho acid, which I employ, can be obtained by heating alphanaphthylamine alpha monosulpho acid (1:8) with aniline and a salt thereof, for instance, by heating one part, by weight, of the said alpha naphthylamine alpha monosulpho acid (1:8) with three to five parts, by weight, of aniline and one part, by weight, of aniline hydrochlorate at from about 160° to 170° centigrade for about ten hours, treating the resulting mixture, when cooled, with diluted hydrochloric acid, boiling the separated acid, after filtering off, with a diluted solution of sodium carbonate in excess in order to remove the excess of aniline, filtering the alkaline solution, acidulating the filtrate obtained by means of a mineral acid and isolating the free acid separated by filtering off, pressing and drying.

In carrying out my process practically I proceed as follows: 0.93 kilos, by weight, of aniline or the corresponding quantity of a soluble salt thereof are diazotized in the usual manner by means of 0.7 kilos, by weight, of sodium nitrite in hydrochloric solution. The resulting diazo solution is allowed to flow into a watery solution of 2.45 kilos, by weight, of the sodium salt of Clève's alphanaphthylamine beta monosulpho acid (beta or delta acid) and about five kilos, by weight, of sodium acetate. In order to complete the reaction, the mixture is heated after some days for a short time at from about 60° to 70° centigrade. After rendering alkaline by the addition of sodium carbonate or soda-lye the resulting amidoazo product is filtered off. The latter is mixed with a small quantity of water and, after adding a concentrated solution in water of 0.7 kilos, by weight, of sodium nitrite, hydrochloric acid is slowly added, until the liquid mixture shows a lasting acid reaction. In this manner the diazo derivative of the above amidoazo product is formed. The resulting mixture is introduced into a watery solution of 6.4 kilos, by weight, of sodium acetate and 3.21 kilos, by weight, of the sodium salt of phenylalphanaphthylamine alpha monosulpho acid

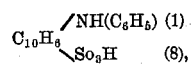

which is derived from alphanaphthylamine alpha monosulpho acid (1:8) as above mentioned. After several hours the mixture is heated for a short time at about 70° centigrade. It is then rendered alkaline, and the complete dye-stuff is isolated by salting out, filtering off, pressing and drying.

My new dye-stuff having the following composition:

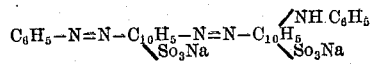

forms after drying and pulverizing an olive-black powder showing metallic luster. It is soluble in water with dark violet color and dissolves in alcohol with blue color. By ammonia it is dissolved with blue color. It is almost insoluble in sodium carbonate and soda-lye, even on heating. In diluted hydrochloric and sulfuric acid it is insoluble. On adding to its watery solutions ammonia or sodium carbonate the color is not changed, while an excess of these two reagents causes the separation of blue or reddish-blue flakes. When soda-lye is added to its solutions in water, the liquid gradually becomes dull, and after some time blue flakes are separated. By mixing its watery solutions with diluted hydrochloric or sulfuric acid the color turns into bluish-green, and after some time greenish-blue flakes are separated. It is dissolved by concentrated sulfuric acid with greenish-blue color, which on the addition of a small quantity of ice water becomes green and turns into blue, when a greater quantity of water is added. Out of the diluted sulfuric solution a blue precipitate is separated after some time. It is suitable for dyeing wool with or without the aid of mordants and produces blue shades with a reddish-hue, which are fast against the action of washing, fulling, light and alkalies.

My new dye-stuff differs from the product which I have described in a separate specification, Serial No. 458,902, as the latter coloring-matter yields blue shades with a greenish hue and results by combining diazotized aniline and Clève's alphanaphthylamine beta monosulpho acid (beta or delta acid) in equimolecular proportions, rediazotizing and coupling the so formed diazo compound with one molecular proportion of paratolylalphanaphthylamine monosulpho acid resulting from alphanaphthylaminemonosulpho acid (1:8) and paratoluidine.

Having thus described my invention and in what manner it can be performed, that which I claim as new, and desire to secure by Letters Patent, is—

1. The process of producing a new coloring-matter by combining equal molecular proportions of diazotized aniline and Clève's alphanaphthylamine beta monosulpho acid beta or delta, rediazotizing the so formed amidoazo product and coupling the resulting diazo compound with one molecular proportion of phenylalphanaphthylamine alpha monosulpho acid, obtainable from alphanaphthylamine-monosulpho acid (1:8) and aniline, substantially as described.

2. As a new product the dye-stuff having the formula:

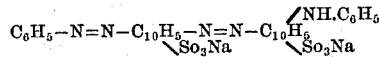

forming an olive-black powder of metallic luster, soluble in ammonia and alcohol with blue color; almost insoluble in sodium carbonate and soda-lye, even on heating; insoluble in dilute hydrochloric and sulphuric acids; soluble in water with violet color, which is not changed on addition of sodium carbonate and ammonia, an excess of these reagents, however, producing a precipitation of blue or reddish-blue flakes, while on addition of soda-lye the aqueous solution becomes dull and separates after some time blue flakes, and on addition of dilute hydrochloric or sulphuric acids the aqueous solution turns bluish-green and separates after some time greenish-blue flakes; soluble in concentrated sulphuric acid with greenish-blue color, which on addition of a little ice-water changes to green, and on addition of an excess of ice-water turns into blue and separates after some time a blue precipitate; dyeing wool with or without the aid of mordants reddish blue; and having the qualities substantially as specified.

In testimony whereof I have signed my name in the presence of two subscribing witnesses.

PHILIPP OTT.

Witnesses:
W. M. ESSENWEIN,
RUDOLPH FRICKE.